United States Patent

Kanade et al.

(10) Patent No.: US 8,192,065 B2
(45) Date of Patent: Jun. 5, 2012

(54) MULTI-COLORED ILLUMINATOR

(75) Inventors: Udayan Kanade, Pune (IN); Balaji Ganapathy, Atlanta, GA (US)

(73) Assignee: I2iC Corporation, Foster City, CA (US)

( * ) Notice: Subject to any disclaimer, the term of this patent is extended or adjusted under 35 U.S.C. 154(b) by 106 days.

(21) Appl. No.: 12/655,905

(22) Filed: Jan. 8, 2010

(65) Prior Publication Data

US 2010/0208489 A1  Aug. 19, 2010

Related U.S. Application Data

(63) Continuation of application No. 11/753,991, filed on May 25, 2007, now Pat. No. 7,810,980.

(30) Foreign Application Priority Data

May 25, 2006  (IN) .......................... 794/MUM/2006

(51) Int. Cl.
*F21V 7/04* (2006.01)

(52) U.S. Cl. ......... 362/613; 362/616; 362/293; 362/227

(58) Field of Classification Search .............. 362/601, 362/613, 608, 610, 616, 97.1–97.4, 227, 362/231, 293; 349/61, 62

See application file for complete search history.

(56) References Cited

U.S. PATENT DOCUMENTS

| | | | | |
|---|---|---|---|---|
| 4,870,484 | A | * | 9/1989 | Sonehara ....................... 348/791 |
| 5,099,343 | A | | 3/1992 | Margerum et al. |
| 6,111,622 | A | * | 8/2000 | Abileah ......................... 349/61 |
| 6,447,134 | B1 | | 9/2002 | Takahashi et al. |
| 6,714,185 | B2 | * | 3/2004 | Kim et al. ..................... 345/102 |
| 6,893,134 | B2 | | 5/2005 | Takahashi et al. |
| 7,812,900 | B2 | * | 10/2010 | Hung et al. ..................... 349/65 |
| 2002/0163606 | A1 | | 11/2002 | Kitai et al. |
| 2003/0095400 | A1 | | 5/2003 | Kashima et al. |
| 2006/0109682 | A1 | | 5/2006 | Ko et al. |
| 2008/0144333 | A1 | * | 6/2008 | Gourlay ......................... 362/609 |

OTHER PUBLICATIONS

WO US07/69785, Jul. 17, 2008, PCT Search Report.

\* cited by examiner

*Primary Examiner* — Bao Q Truong

(57) ABSTRACT

An apparatus for providing a multicolored illuminator is disclosed. In one embodiment, the apparatus comprises a first sheet comprising a plurality of columnar illuminators stacked side by side, and a plurality of colored light sources placed along an edge of the first sheet. The plurality of columnar illuminators diffuse light generated by the plurality of colored light sources. The light emanates in a predetermined pattern.

3 Claims, 8 Drawing Sheets

US 8,192,065 B2

MULTI-COLORED ILLUMINATOR

CROSS-REFERENCE TO RELATED APPLICATIONS

The present application is a continuation of patent application Ser. No. 11/753,991 entitled "MULTI-COLORED ILLUMINATOR FOR DISPLAYS" filed on May 25, 2007 now U.S. Pat. No. 7,810,980 at the USPTO, which in turn claimed the benefit of and priority to Indian Provisional Patent Application No. 794/MUM/2006 entitled "MULTI-COLORED ILLUMINATOR FOR DISPLAYS" filed on May 25, 2006.

FIELD

The present invention relates to displays. More particularly, the invention relates to a multi-colored illuminator for displays.

BACKGROUND

Flat screen color displays normally use illumination in the form of white light. The white light falls on the display such as a liquid crystal display (LCD) which uses color filters to depict colors. Color filters reduce efficiency of the display since large amounts of light are absorbed. Another disadvantage is caused by the color filters that lower the transmittance of the display.

Another method for illuminating displays involves striking dyed nematic crystal panels one after the other. White light is passed through them. Each layer subtracts some amount of the red, blue and green respectively from the white light according to the voltage applied to it and displays the colored image. But this also has a disadvantage of loss of light and hence reduced efficiency. It also suffers from parallax errors.

SUMMARY

An apparatus for providing a multicolored illuminator for displays is disclosed. In one embodiment, the apparatus comprises a first sheet comprising a plurality of columnar illuminators stacked side by side, and a plurality of colored light sources placed along an edge of the first sheet. The plurality of columnar illuminators diffuse light generated by the plurality of colored light sources. The light emanates in a predetermined pattern.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

DETAILED DESCRIPTION

A multi-colored illuminator system for backlit displays is disclosed. In one embodiment, the apparatus comprises a first sheet comprising a plurality of columnar illuminators stacked side by side, and a plurality of colored light sources placed along an edge of the first sheet. The plurality of columnar illuminators diffuse light generated by the plurality of colored light sources. The light emanates in a predetermined pattern.

Figure 1:
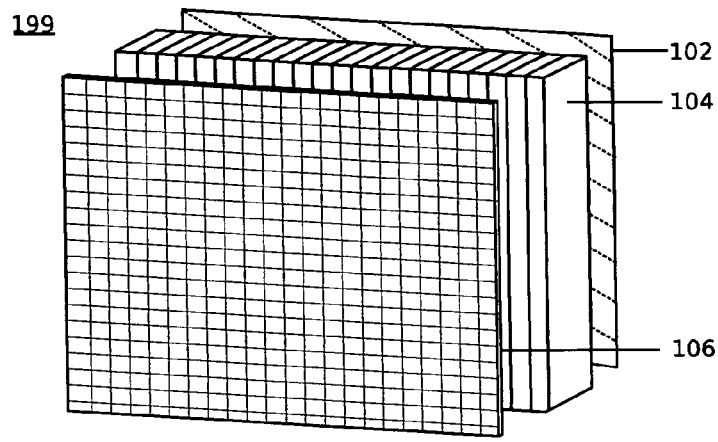
FIG. 1 illustrates a block diagram of an exemplary backlit display, according to one embodiment.

FIG. 1 illustrates a block diagram of an exemplary backlit display 199, according to one embodiment. An image is displayed on a flat panel screen 106. In an embodiment, the flat panel screen 106 is an LCD screen. Sheet 104 includes a number of illuminators. Each illuminator illuminates one column of pixels. Different illuminators emanate light of different colors. Thus, light illuminating different pixel columns is of different colors. In an embodiment, back-mirror 102 reflects light emanating from the back surface of the sheet 104. In an alternate embodiment, the illuminator column is not vertical. FIG. 1 illustrates the complete display system. Described henceforth, is a single column of the display system.

Figure 2A:
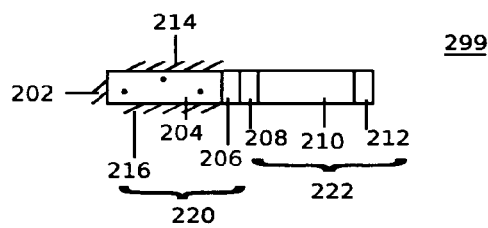
FIG. 2A illustrates a block diagram of an exemplary column of an exemplary backlit display system as viewed from the top, according to one embodiment.

FIG. 2A illustrates a block diagram of an exemplary column 299 of an exemplary backlit display system as viewed from the top, according to one embodiment. Polarizer 208, liquid crystal 210 and polarizer 212 together form light valve 222 that modulates the intensity of light passing through it. Illuminator column 204, cladding sheet 206 and mirrors 202, 214 and 216 together form a light guide 220. Illuminator column 204 has a higher refractive index than cladding sheet 206. Light is guided inside the light guide 220 by reflection or total internal reflection. Illuminator column 204 has a sparse distribution of light diffuser particles. The light diffuser may be a metallic powder, metallic pigment, organic powder, and organic pigment. The light diffuser reflects incident light. In an alternate embodiment, the light diffuser may be a transparent particle, and transparent bubble. The light diffuser disperses light by refraction. Back-mirror 202 reflects light from the back surface of the illuminator column 204. Side-mirrors 214, 216 reflect light from the side surfaces of column 204. Side-mirrors 214, 216 prevent light from leaking into the adjacent columns. The mirrors 202, 214 and 216 may be a standard mirror or similar light reflector, including metallic surfaces, distributed Bragg reflectors, hybrid reflectors, total internal reflectors or omni-direction reflectors.

Figure 2B:
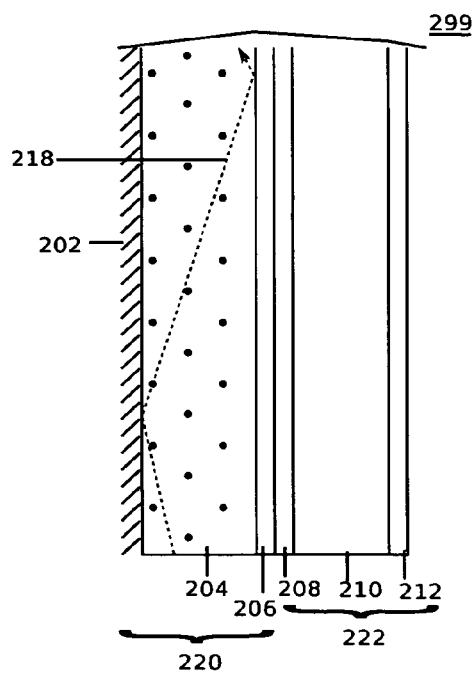
FIG. 2B illustrates a block diagram of an exemplary column of an exemplary backlit display system as viewed from the side, according to one embodiment.

FIG. 2B illustrates a block diagram of an exemplary column 299 of an exemplary backlit display system as viewed from the side, according to one embodiment. Light ray 218 is guided inside the light guide 220 by reflection or total internal reflection.

Figure 2C:
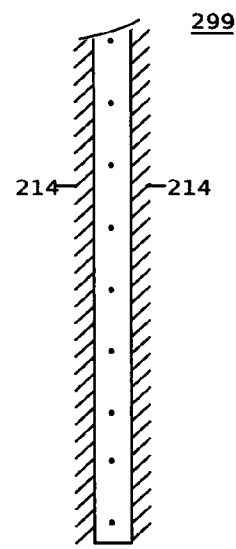
FIG. 2C illustrates a block diagram of an exemplary column of an exemplary backlit display system as viewed from the front, according to one embodiment.

FIG. 2C illustrates a block diagram of an exemplary column 299 of an exemplary backlit display system as viewed from the front, according to one embodiment. A uniform distribution of light diffuser particles is illustrated. In alternate embodiments, the concentration of the diffuser particles is varied.

Figure 3A:
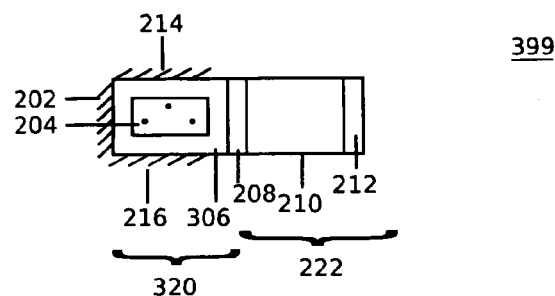
FIG. 3A illustrates a block diagram of an exemplary column of an exemplary backlit display system as viewed from the top, according to one embodiment.

FIG. 3A illustrates a block diagram of an exemplary column 399 of an exemplary backlit display system as viewed from the top, according to one embodiment. Cladding 306 has a lower refractive index than illuminator column 204. Some light inside the illuminator column 204 undergoes total internal reflection from the boundary of the cladding sheet 306. Illuminator column 204 and cladding 306 together form a light guide 320. Light is guided inside the light guide 320 by total internal reflection.

Figure 3B:
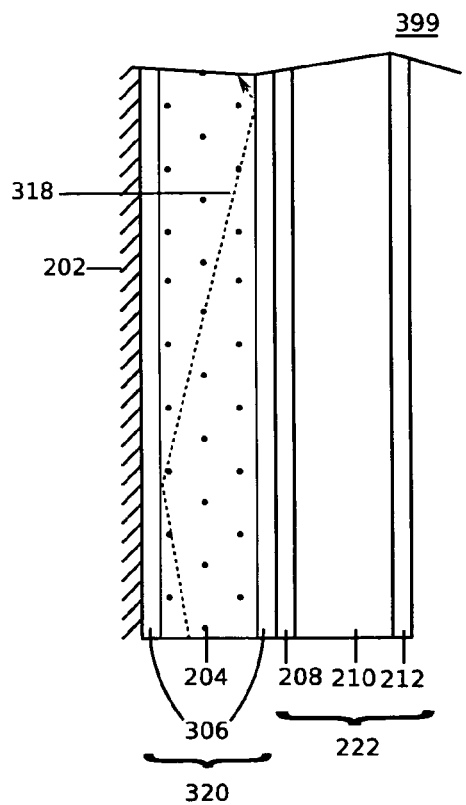
FIG. 3B illustrates a block diagram of an exemplary column of an exemplary backlit display system as viewed from the side, according to one embodiment.

FIG. 3B illustrates a block diagram of an exemplary column 399 of an exemplary backlit display system as viewed from the side, according to one embodiment. Light ray 318 is guided inside the light guide 320 by reflection or total internal reflection. Polarizer 208, liquid crystal 210 and polarizer 212 together form light valve 222 that modulates the intensity of light passing through it. Back-mirror 202 reflects light from the back surface of the illuminator column 204. Cladding 306 has a lower refractive index than illuminator column 204.

Figure 3C:
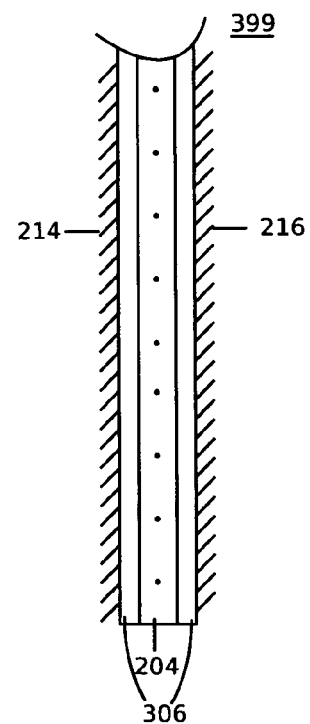
FIG. 3C illustrates a block diagram of an exemplary column of an exemplary backlit display system as viewed from the front, according to one embodiment.

FIG. 3C illustrates a block diagram of an exemplary column 399 of an exemplary backlit display system as viewed from the front, according to one embodiment. Cladding 306 has a lower refractive index than illuminator column 204. Some light inside the illuminator column 204 undergoes total internal reflection from the boundary of the cladding sheet 306. Side-mirrors 214, 216 reflect light from the side surfaces of column 204. Side-mirrors 214, 216 prevent light from leaking into the adjacent columns.

Figure 4:
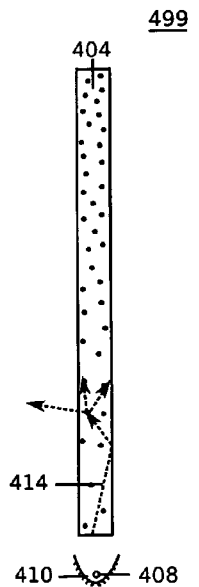
FIG. 4 illustrates a block diagram of an illuminator column and light source system as viewed from the front, according to an embodiment.

FIG. 4 illustrates a block diagram of an illuminator column and light source system 499 as viewed from the front, according to an embodiment. Near one end of the illuminator column 404, a light source 408 is placed. The light source 408 may be an LED, or any other light source. The light from the light source 408 enters the illuminator column 404. In one embodiment, the light from the light source 408 enters the illuminator column 404 using an optical arrangement such as a focusing reflector 410. Illuminator column 404 includes a diffuser that may be constituted of small transparent particles or bubbles, which disperse light 414 by refraction, reflection at the boundary, by diffusion inside the particle, by scattering, or by total internal reflection. The light from the light source 408 is dispersed over the entire length of the illuminator column 404, and exits in all directions. Light exiting in the direction of screen pixels illuminates the pixels. Light exiting in other directions may be recycled using reflectors as described above in conjunction with FIG. 2A.

Figure 5:
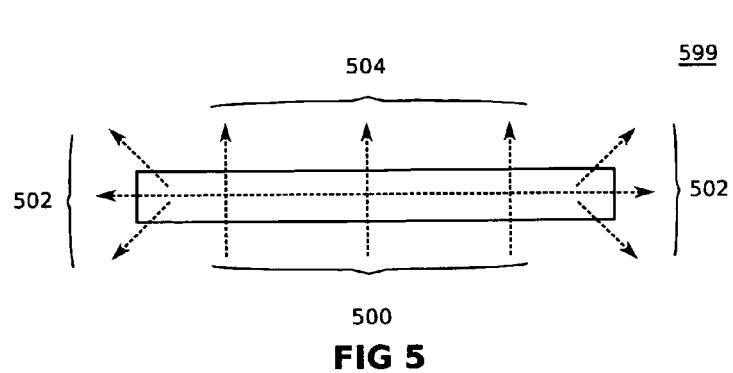
FIG. 5 illustrates a block diagram of an exemplary element of an illuminator column 404, according to one embodiment.

FIG. 5 illustrates a block diagram of an exemplary element 599 of an illuminator column 404, according to one embodiment. Element 599 has a very small height. Light 500 enters element 599. Some of the light gets dispersed and leaves the light guide as illumination light 502, and the remaining light 506 travels on to the next illuminator element. The power of the light 500 going into element 599 is matched by the sum of the powers of the dispersed light 502 and the light continuing to the next element 599. The fraction of dispersed light 502 with respect to the light 500 entering the element 599 is the photic dispersivity of element 599. The photic dispersivity of element 599 is in direct proportion to the height of element 599. The ratio of the photic dispersivity of element 599 to the height of element 599 is the photic dispersion density of element 599. As the height of element 599 decreases, the photic dispersion density approaches a constant. This photic dispersion density of element 599 bears a certain relationship to the diffuser concentration at the element 599. The relationship is approximated to a certain degree as a direct proportion. Knowing the diffuser concentration of an element allows evaluation of the photic dispersion density of element 599, and vice versa.

As the height of element 599 is reduced, power in the emanating light 502 reduces proportionately. The ratio of power of the emanating light 502 to the height of element 599, which approaches a constant as the height of the element is reduced, is the emanated power density at element 599. The emanated power density at element 599 is the photic dispersion density times the power of the incoming light (i.e. power of light traveling through the element). The gradient of the power of light traveling through the element 599 is the negative of the emanated power density. These two relations give a differential equation. This equation can be represented in the form "$dP/dh = -qP = -K$" where:

h is the distance of the illuminator element from the light source;

P is the power of the light being guided through that element;

q is the photic dispersion density of the element; and

K is the emanated power density at that element.

This equation is used to find the emanated energy density given the photic dispersion density at each element. This equation is also used to find the photic dispersion density of each element, given the emanated energy density. To design a particular illuminator with a particular emanated energy density, the above differential equation is solved to determine the photic dispersion density at each element of the illuminator, such as illuminator 404. From this, the diffuser concentration at each element of an illuminator is determined. Such an illuminator is used in a light guide, to give an illuminator column of required emanated energy density over the length of the column.

If a uniform concentration of diffuser is used in the illuminator, the emanated power density drops exponentially with the height. Uniform emanated power density may be approximated by choosing a diffuser concentration such that the power drop from the end (near the light source) to the opposite end, is minimized. To reduce the power loss and also improve the uniformity of the emanated power, the opposite end reflects light back into the illuminator column. In an alternate embodiment, another light source emanates light into the opposite end.

To achieve uniform illumination, the photic dispersion density and hence the diffuser concentration is varied over the illuminator surface. This can be done using the above methodology. The photic dispersion density is $q=K/(A-hK)$, where A is the power going into the illuminator 404 and K is the emanated power density at each element, a constant number for uniform illumination. If the total height of the illuminator is H, then H times K is less than A, i.e. total power emanated should be less than total power going into the light guide. If the complete power going into the light guide is utilized for illumination, then H times K equals A. In one embodiment, H times K is kept only slightly less than A, so that only a little power is wasted, and the photic dispersion density is always finite.

Figure 6:
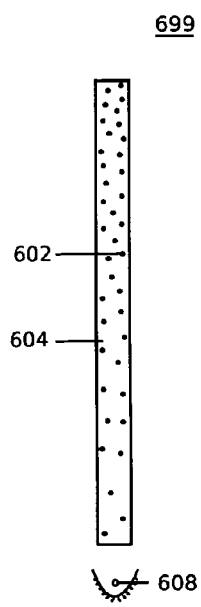
FIG. 6 illustrates a diagram of an illuminator column having a varied concentration of diffuser particles, according to one embodiment.

FIG. 6 illustrates a diagram of an illuminator column 699 having a varied concentration of diffuser particles, according to one embodiment. The concentration of the diffuser 602 is varied from sparse to dense from the light source end of illuminator column 604 to the opposite end.

Figure 7:
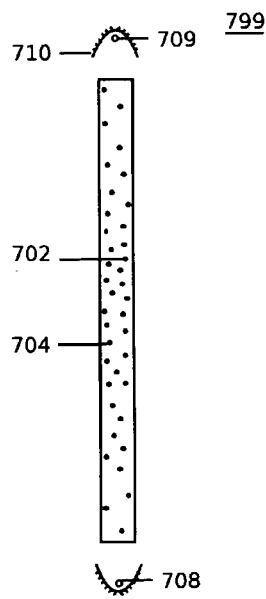
FIG. 7 illustrates an exemplary illuminator column having two light sources, according to one embodiment.

FIG. 7 illustrates an exemplary illuminator column 799 having two light sources, according to one embodiment. By using two light sources 708, 709, high variations in concentration of diffuser 702 in the illuminator column 799 is not necessary. The differential equation provided above is used independently for deriving the emanated power density due to each of the light sources 708, 709. The addition of these two power densities provides the total light power density emanated at a particular core element of illuminator 704. In one embodiment, the light from the light source 709 enters the illuminator column 704 using an optical arrangement such as a focusing reflector 710.

Uniform illumination for light source 799 is achieved by photic dispersion density $q=1/sqrt((h-H/2)^2+C/K^2)$ where sqrt is the square root function, ^ stands for exponentiation, K is the average emanated power density per light source (numerically equal to half the total emanated power density at each element) and $C=A(A-HK)$.

Figure 8:
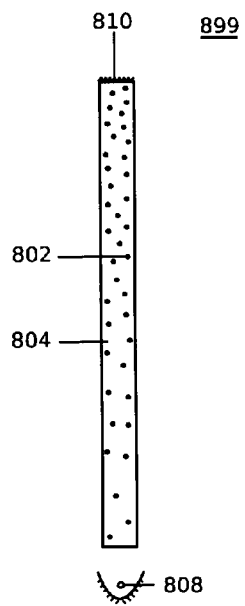
FIG. 8 illustrates a diagram of an exemplary mirrored illuminator column, according to one embodiment.

FIG. 8 illustrates a diagram of an exemplary mirrored illuminator column 899, according to one embodiment. By using a mirrored illuminator 804, high variations in concentration of diffuser 802 in the core 804 is not necessary. Top end 810 of the central illuminator column 804 is mirrored, such that it will reflect light back into central illuminator column 804. In one embodiment, the light from the light source 808 enters the illuminator column 804 using an optical arrangement such as a focusing reflector. The photic dispersion density to achieve uniform illumination in light source 899 is:

$$q=1/sqrt((h-H)^2+D/K^2)$$

where $D=4A(A-HK)$.

For any system of the present invention (such as the light sources in the form of surfaces 699, 799 and 899), the same pattern of emanation will be sustained even if the light source power changes. For example, if the light source, of illuminator column 699 provides half the rated power, each element of the core will emanate half its rated power. Specifically, a light guide core designed to act as a uniform illuminator acts as a uniform illuminator at all power ratings by changing the power of its light source or sources. If there are two light sources, their powers are changed in tandem to achieve this effect.

Coupling of Light to the Columnar Illuminator

Figure 9:
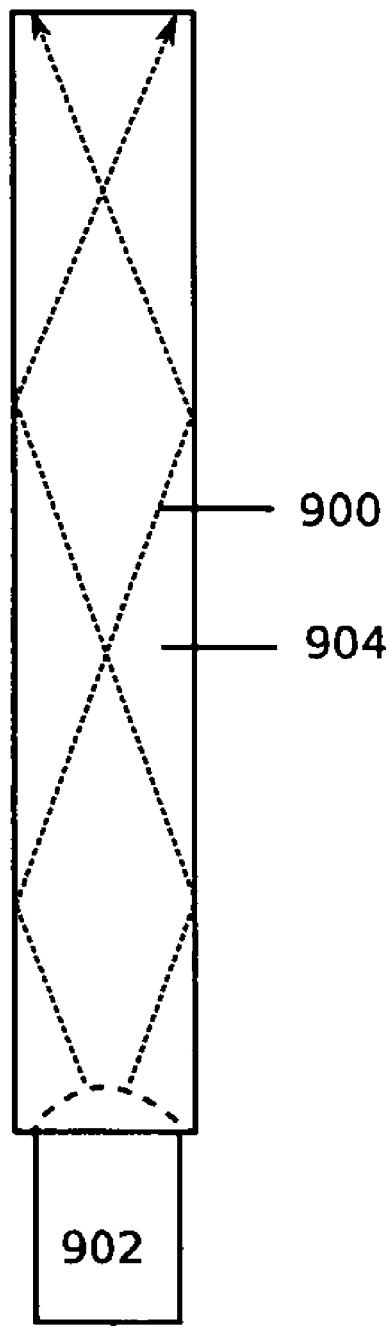
FIG. 9 illustrates a block diagram of an exemplary light source illuminating an illuminator column according to one embodiment.

FIG. 9 illustrates a block diagram of an exemplary light source 999 illuminating an illuminator column according to one embodiment. Light source 902 is a primary source of light. In one embodiment, light source 902 is an LED. Some part of light source 902 is inserted into the illuminator column 904. Light ray 900, enters illuminator column 904. In one embodiment, light 900 travels within the illuminator column 904 due to total internal reflection. In another embodiment, light 900 travels within illuminator column 904 due to reflection from a reflecting surface. The reflecting surface may be any light reflector, including metallic surfaces, distributed Bragg reflectors, hybrid reflectors, total internal reflectors or omni-direction reflectors.

Figure 10A:
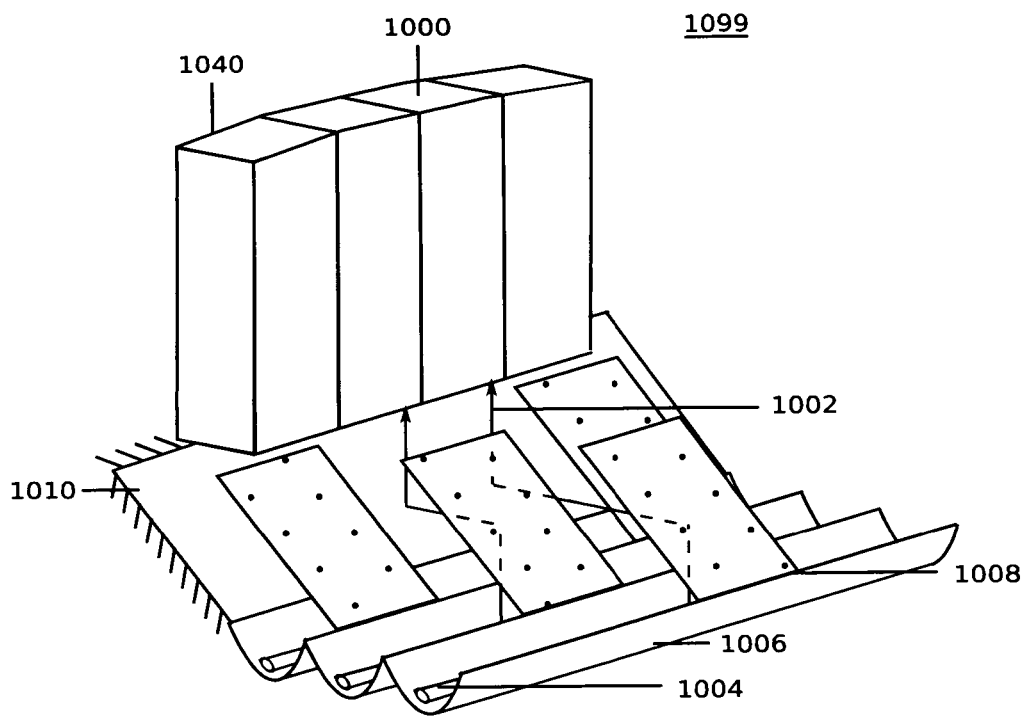
FIG. 10A illustrates a block diagram of an exemplary light source illuminating a multicolored illuminator, according to one embodiment.

FIG. 10A illustrates a block diagram of an exemplary light source 1099 illuminating a multicolored illuminator 1040, according to one embodiment. Light source 1099 includes number of tubular sources of light 1004. In one embodiment, each tubular source of light is a colored fluorescent tube. In another embodiment, the tubular source of light is a transparent tube with a small concentration of microscopic dispersing particles in it. A tubular light source can be made in the same way as illuminator column 404. Equations described in conjunction with FIG. 5 are used for providing a uniform emanation of light from the tubular light source 1004. In one embodiment, the dispersing particles have special shapes for directional extraction of light. Tubular light source 1004 is placed at the focus of a reflecting trough 1006. In one embodiment, the shape of the trough 1006 is parabolic. Each light trough 1006 is partially covered by a mirror 1008. Mirrors 1008 are situated such that they reflect light from the tubular light sources 1004 into corresponding columns of illuminator 1040. In one of the embodiments, one third of the light trough 1006 is covered with mirror 1008. The mirror 1008 may be any light reflector, including metallic surfaces, distributed Bragg reflectors, hybrid reflectors, total internal reflectors or omni-direction reflectors. Light of a first color 1002 undergoes reflection due to mirror 1008 and mirror 1010 and finally enters the corresponding illuminator column 1000.

Figure 10B:
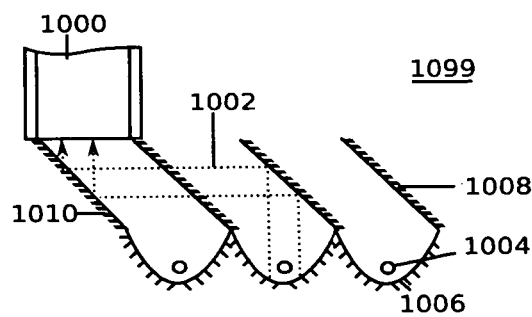
FIG. 10B illustrates a block diagram of an exemplary light source illuminating a multicolored illuminator column as seen from the front, according to one embodiment.

FIG. 10B illustrates a block diagram of an exemplary light source 1099 illuminating a multicolored illuminator column 1000 as seen from the front, according to one embodiment. Light of a first color 1002 undergoes reflection due to mirror 1008 and mirror 1010 and finally enters the corresponding illuminator column 1000. Each light trough 1006 is partially covered by a mirror 1008. Mirrors 1008 are situated such that they reflect light from the tubular light sources 1004 into corresponding columns of illuminator 1040.

Figure 10C:
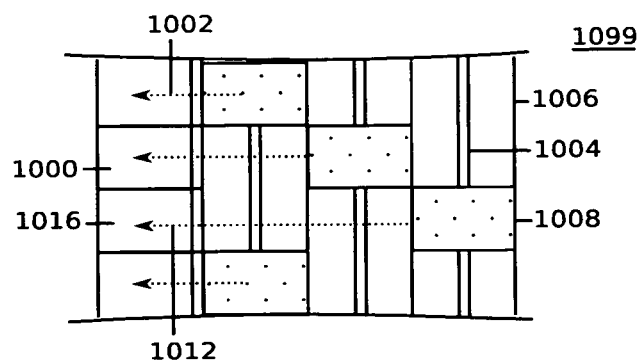
FIG. 10C illustrates a block diagram of an exemplary light source illuminating a multicolored illuminator column as seen from the top, according to one embodiment.

FIG. 10C illustrates a block diagram of an exemplary light source 1099 illuminating a multicolored illuminator column 1000 as seen from the top, according to one embodiment. Light of a first color 1002 undergoes reflection due to mirror 1008 and mirror 1010 and finally enters the corresponding illuminator column 1000. Light of a second color 1012 also similarly undergoes reflection due to mirror 1014 and mirror 1010 and enters its corresponding illuminator column 1016. Each light trough 1006 is partially covered by a mirror 1008. Mirrors 1008 are situated such that they reflect light from the tubular light sources 1004 into corresponding columns of illuminator 1040.

Figure 11A:
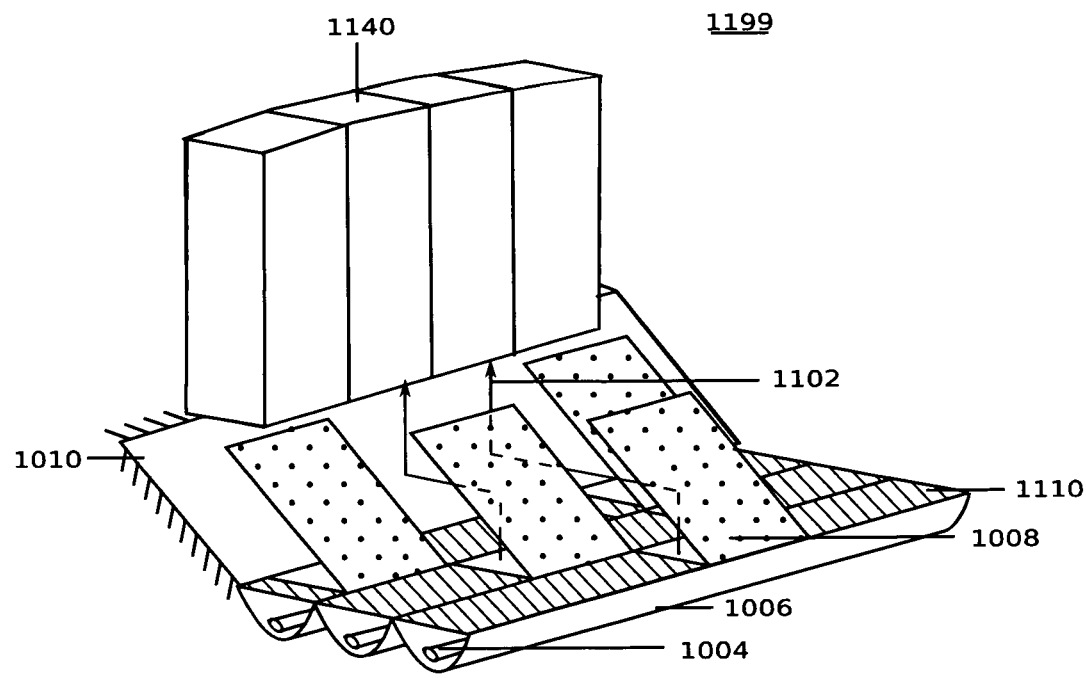
FIG. 11A illustrates a block diagram of an exemplary light source illuminating a multicolored illuminator, according to another embodiment.

FIG. 11A illustrates a block diagram of an exemplary light source 1199 illuminating a multicolored illuminator 1140, according to another embodiment. Mirror 1110 reflects light back into the light trough 1106. Mirror 1110 may be any light reflector, including metallic surfaces, distributed Bragg reflectors, hybrid reflectors, total internal reflectors or omni-direction reflectors. It prevents wastage of light from regions where light extraction is not supposed to happen. Light of a first color 1102 undergoes reflection due to mirror 1008 and mirror 1110 and finally enters the corresponding illuminator column 1140.

Figure 11B:
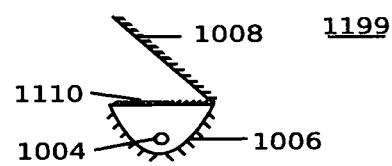
FIG. 11B illustrates a block diagram of an exemplary light source illuminating a multicolored illuminator column, as seen from the front, according to another embodiment.

FIG. 11B illustrates a block diagram of an exemplary light source 1199 illuminating a multicolored illuminator column 1140, as seen from the front, according to another embodiment. Each light trough 1006 is partially covered by a mirror 1110. Mirrors 1110 are situated such that they reflect light from the tubular light sources 1004 into corresponding columns of illuminator 1140. Light of a first color 1002 undergoes reflection due to mirror 1110 and mirror 1002 and finally enters the corresponding illuminator column 1000.

Figure 11C:
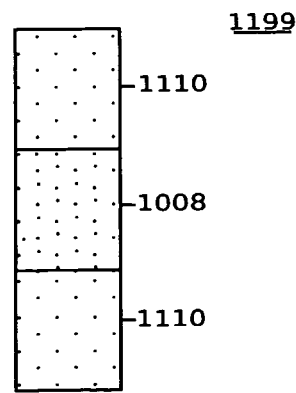
FIG. 11C illustrates a block diagram of an exemplary light source illuminating a multicolored illuminator column, as seen from the top, according to another embodiment.

FIG. 11C illustrates a block diagram of an exemplary light source 1199 illuminating a multicolored illuminator column 1140, as seen from the top, according to another embodiment. Light of a first color undergoes reflection due to mirror 1008 and mirror 1110 and finally enters the corresponding illuminator column.

Figure 12:
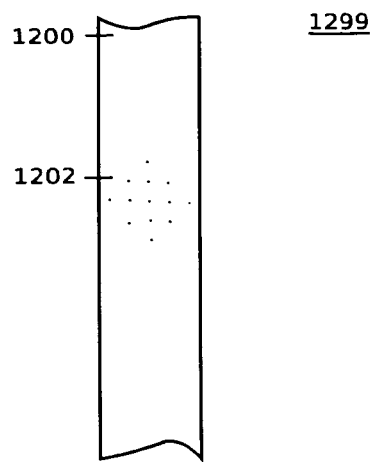
FIG. 12 illustrates a block diagram of an exemplary light source illuminating a multicolored illuminator column, according to one embodiment.

FIG. 12 illustrates a block diagram of an exemplary light source 1299 illuminating a multicolored illuminator column, according to one embodiment. Transparent tube 1200 includes spots 1202 of light dispersing particles. When light source 1299 is illuminated with light from an end, light is extracted at all such spots 1202. In an embodiment, such a light source 1299 is used in place of light source 1004 of light source 1099, with the spots 1202 being aligned to the mirrors 1008. To get the desired emanation of light such that same density of light is emanated at each spot, the differential equation presented in conjunction with FIG. 5 needs to be suitably modified and solved to get the disperser concentration at each spot.

Figure 13A:
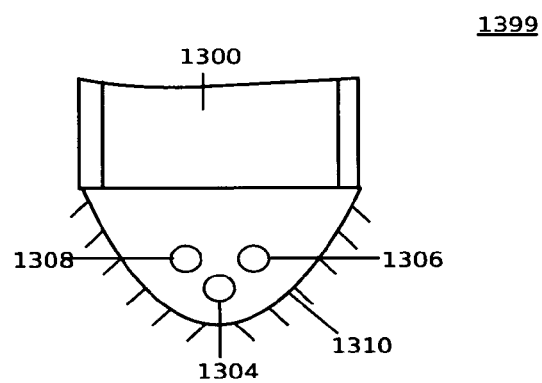
FIG. 13A illustrates a block diagram of an exemplary light source illuminating a multicolored illuminator column, according to one embodiment.

FIG. 13A illustrates a block diagram of an exemplary light source 1399 illuminating a multicolored illuminator column 1300, according to one embodiment of the invention. The tubular light sources 1304, 1306 and 1308 are all placed inside a single trough 1310. In one embodiment, the trough comprises a parabolic reflecting surface which may be any light reflector, including metallic surfaces, distributed Bragg reflectors, hybrid reflectors, total internal reflectors or omni-direction reflectors. The light extracted from the tubular light source enters the multicolored illuminator column 1300.

Figure 13B:
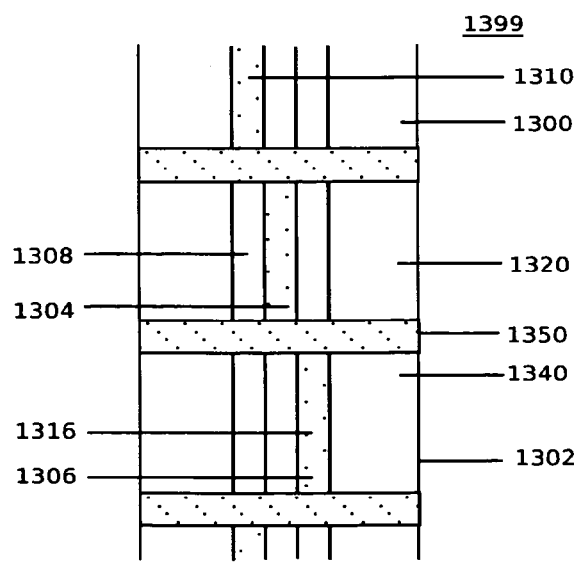
FIG. 13B illustrates a block diagram of an exemplary light source illuminating a multicolored illuminator column, according to one embodiment.

FIG. 13B illustrates a block diagram of an exemplary light source 1399 illuminating a multicolored illuminator column 1300, according to one embodiment. The tubular sources of light 1304, 1306 and 1308 are transparent tubes with a small concentration of disperser particles 1316 in them. The light extracted from the tubular light sources 1304, 1306 and 1308 enters the multicolored illuminator columns 1300, 1320 and 1340. The disperser is added at spots adjacent to corresponding illuminator columns. Reflector 1350 causes a large portion of light extracted from a particular tubular source of light 1304 to enter the corresponding illuminator column 1320. The tubular light sources 1304, 1306 and 1308 are all placed inside a single trough 1310.

Transflective Display

Figure 14:
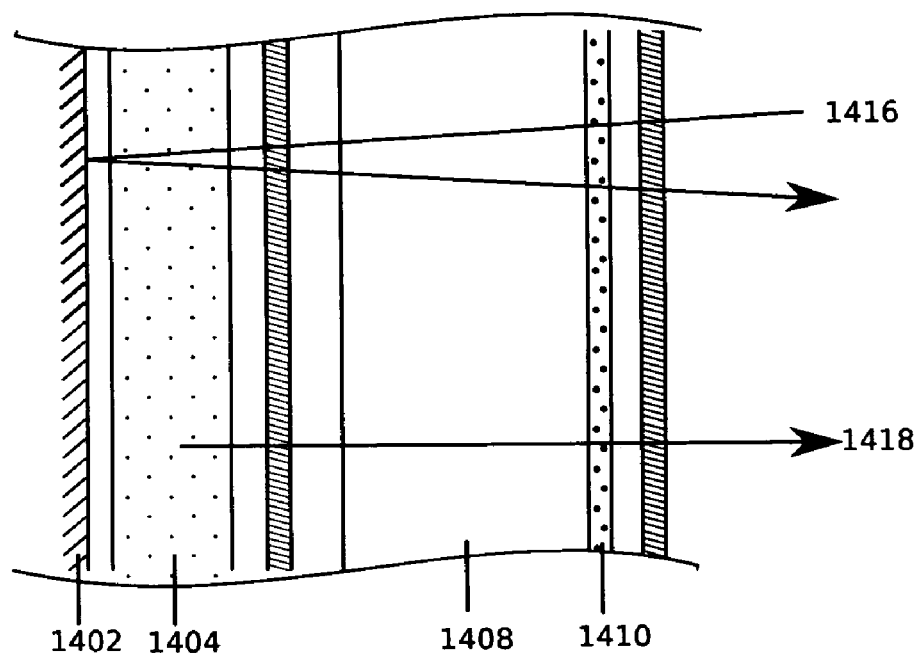
FIG. 14 illustrates an exemplary transflective display system which uses a multi-colored illuminator, according to one embodiment of the present invention.

FIG. 14 illustrates an exemplary transflective display system 1499 which uses a multi-colored illuminator, according to one embodiment. A multi-colored illuminator includes columnar light sources which emit light of more than one colors such as exemplary columnar light source 1404. Pixel column 1408 of a particular color has a color filter 1410 of the same color on top of it. In the transmissive mode, light 1418 from the multi-colored illuminator column illuminates the pixels. Since the color filters are of the same colors as the columnar sources, a minimum light is absorbed by the filter 1410. In the reflective mode, ambient light 1416 passes through the color filter 1410 and the illuminator column 1404 and gets reflected from the reflecting surface 1402. Each pixel acquires the color imparted by its color filter.

A system of multi-colored illuminator for displays is disclosed. It is understood that the embodiments described herein are for the purpose of elucidation and should not be considered limiting the subject matter of the present patent. Various modifications, uses, substitutions, recombinations, improvements, methods of production without departing from the scope or spirit of the present invention would be evident to a person skilled in the art.

We claim:

1. An apparatus comprising:
   a first sheet comprising a plurality of columnar illuminators stacked side by side;
   a plurality of color filters; and
   a screen capable of displaying an image placed in front of the first sheet;
   wherein different columnar illuminators emanate light of different colors;
   the color of at least one color filter, said color filter being placed in front of a columnar illuminator, is the same as the color emitted by that columnar illuminator; and
   the screen comprises pixels.

2. The apparatus of claim 1, wherein each columnar illuminator illuminates one column of pixels.

3. The apparatus of claim 1 acting as a transflective display.

* * * * *